US012561083B2

(12) United States Patent　　　(10) Patent No.:　US 12,561,083 B2
Marripudi et al.　　　　　　　　(45) **Date of Patent:　\*Feb. 24, 2026**

(54) NON-VOLATILE MEMORY STORAGE DEVICE CAPABLE OF SELF-REPORTING PERFORMANCE CAPABILITIES

(71) Applicant: Samsung Electronics Co., Ltd., Suwon-si (KR)

(72) Inventors: Gunneswara R. Marripudi, Fremont, CA (US); Vishwanath Maram, San Jose, CA (US)

(73) Assignee: Samsung Electronics Co., Ltd., Yongin-si (KR)

( \* ) Notice: Subject to any disclaimer, the term of this patent is extended or adjusted under 35 U.S.C. 154(b) by 0 days.

This patent is subject to a terminal disclaimer.

(21) Appl. No.: 18/886,659

(22) Filed: Sep. 16, 2024

(65) Prior Publication Data

US 2025/0013377 A1　　Jan. 9, 2025

Related U.S. Application Data

(63) Continuation of application No. 17/227,998, filed on Apr. 12, 2021, now Pat. No. 12,093,557, which is a
(Continued)

(51) Int. Cl.
*G06F 3/06* (2006.01)
*G06F 11/34* (2006.01)

(52) U.S. Cl.
CPC .......... *G06F 3/0653* (2013.01); *G06F 3/0605* (2013.01); *G06F 3/0683* (2013.01); *G06F 11/34* (2013.01)

(58) Field of Classification Search
CPC .... G06F 3/0653; G06F 3/0688; G06F 3/0604; G06F 3/0631; G06F 12/0246
See application file for complete search history.

(56) References Cited

U.S. PATENT DOCUMENTS 7,970,806 B2　6/2011　Park et al.
8,812,770 B2　8/2014　Sadovsky et al.
(Continued)

FOREIGN PATENT DOCUMENTS

CN　　102473130 A　　5/2012
CN　　103092764 A　　5/2013
(Continued)

OTHER PUBLICATIONS

Chinese Notice of Allowance dated Aug. 28, 2023, issued in Chinese Patent Application No. 201810027107.3 (6 pages).
(Continued)

*Primary Examiner* — Tasnima Matin
(74) *Attorney, Agent, or Firm* — Womble Bond Dickinson (US) LLP

(57) ABSTRACT

Provided is a storage device including a first non-volatile storage media having first performance capabilities; a second non-volatile storage media having second performance capabilities different from the first performance capabilities; and a device controller configured to report to a host software the first performance capabilities, the second performance capabilities, changes to the first performance capabilities, and changes to the second performance capabilities.

20 Claims, 8 Drawing Sheets

Related U.S. Application Data continuation of application No. 15/588,567, filed on May 5, 2017, now Pat. No. 11,003,381.

(60) Provisional application No. 62/468,262, filed on Mar. 7, 2017.

(56)                    References Cited

U.S. PATENT DOCUMENTS

| | | | |
|---|---|---|---|
| 9,166,890 B2 | 10/2015 | Maytal et al. | |
| 9,773,033 B2 | 9/2017 | Hart et al. | |
| 9,792,227 B2 | 10/2017 | Ki et al. | |
| 9,842,660 B1 * | 12/2017 | Karamcheti | G06F 11/0781 |
| 10,268,257 B2 | 4/2019 | Nomura | |
| 10,579,305 B2 | 3/2020 | Lu | |
| 10,782,879 B2 | 9/2020 | Kanno | |
| 2001/0056521 A1 | 12/2001 | Fujiwara et al. | |
| 2008/0034148 A1 | 2/2008 | Gower et al. | |
| 2011/0119430 A1 | 5/2011 | Lai et al. | |
| 2011/0179247 A1 | 7/2011 | Mine et al. | |
| 2012/0198129 A1 | 8/2012 | Van Aken et al. | |
| 2013/0111298 A1 | 5/2013 | Seroff et al. | |
| 2014/0258805 A1 | 9/2014 | Casado et al. | |
| 2015/0032915 A1 | 1/2015 | Hur et al. | |
| 2015/0161034 A1 | 6/2015 | Fisher | |
| 2015/0301748 A1 | 10/2015 | Lee | |
| 2016/0162438 A1 | 6/2016 | Hussain et al. | |
| 2017/0024166 A1 | 1/2017 | Singh et al. | |
| 2017/0038974 A1 | 2/2017 | Keshava | |
| 2017/0344284 A1 * | 11/2017 | Choi | G06F 3/0688 |
| 2018/0004452 A1 * | 1/2018 | Ganguli | H04L 41/5025 |
| 2018/0004559 A1 | 1/2018 | Geml et al. | |
| 2019/0361611 A1 * | 11/2019 | Hosogi | G06F 12/00 |

FOREIGN PATENT DOCUMENTS

| | | | |
|---|---|---|---|
| CN | 105700826 A | 6/2016 | |
| JP | 2015-64758 A | 4/2015 | |
| JP | 2015-138432 A | 7/2015 | |
| JP | 2016-45940 A | 4/2016 | |
| JP | 2017-27387 A | 2/2017 | |
| KR | 10-2009-0037705 A | 4/2009 | |
| KR | 10-2010-0126189 A | 12/2010 | |
| KR | 10-2014-0100329 A | 8/2014 | |
| KR | 10-2014-0105852 A | 9/2014 | |
| KR | 10-2015-0014002 A | 2/2015 | |
| KR | 10-2015-0121560 A | 10/2015 | |
| KR | 10-2017-0016205 A | 2/2017 | |
| WO | 2013/066518 A1 | 5/2013 | |
| WO | 2014/123649 A1 | 8/2014 | |

OTHER PUBLICATIONS

Korean Notice of Allowance dated Jul. 2, 2024, issued in corresponding Korean Patent Application No. 10-2024-0010741, 8 pages.

* cited by examiner

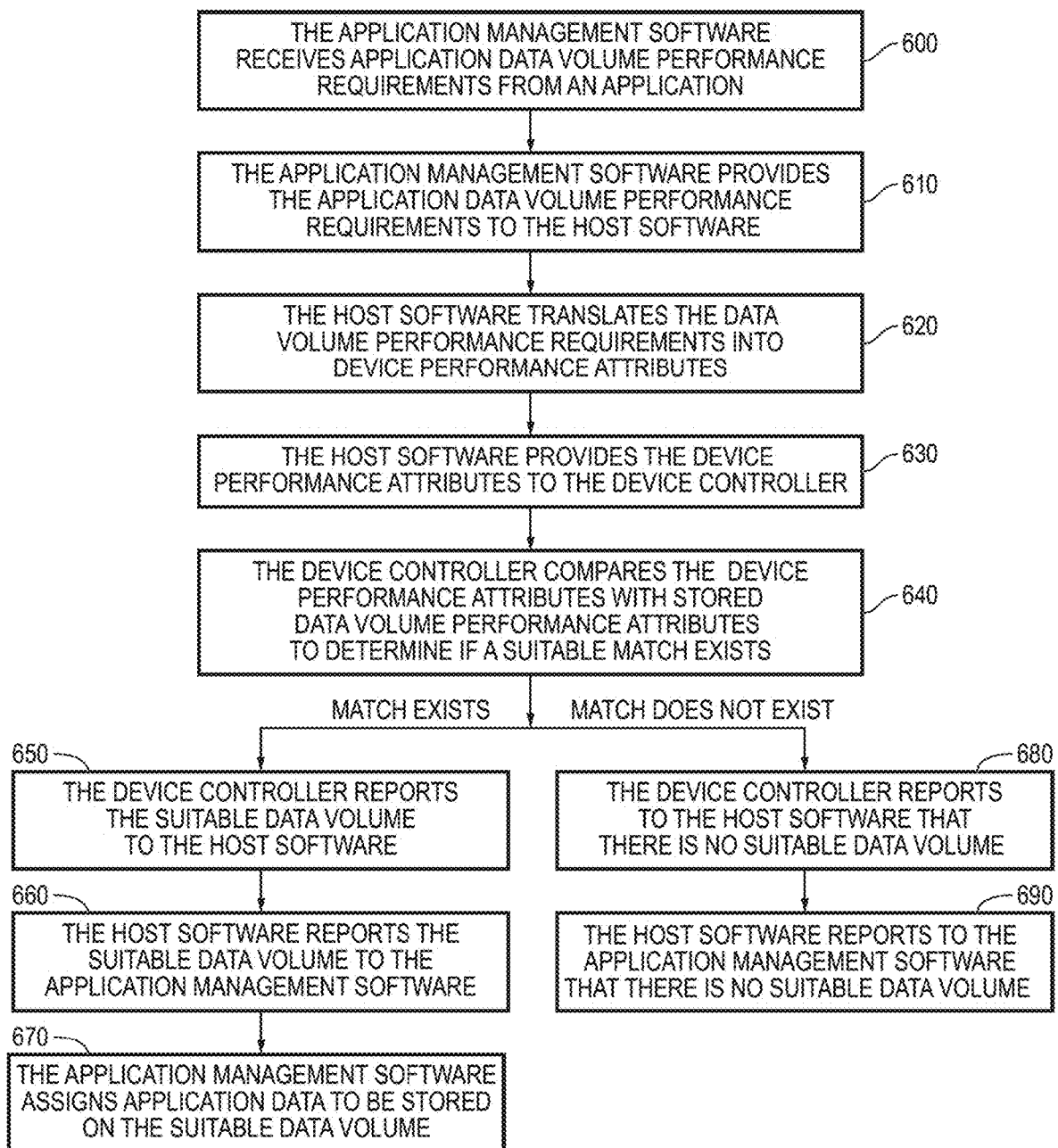

THE APPLICATION MANAGEMENT SOFTWARE
RECEIVES APPLICATION DATA VOLUME PERFORMANCE
REQUIREMENTS FROM AN APPLICATION ⟋600

THE APPLICATION MANAGEMENT SOFTWARE PROVIDES
THE APPLICATION DATA VOLUME PERFORMANCE
REQUIREMENTS TO THE HOST SOFTWARE ⟋610

THE HOST SOFTWARE TRANSLATES THE DATA
VOLUME PERFORMANCE REQUIREMENTS INTO
DEVICE PERFORMANCE ATTRIBUTES ⟋620

THE HOST SOFTWARE PROVIDES THE DEVICE
PERFORMANCE ATTRIBUTES TO THE DEVICE CONTROLLER ⟋630

THE DEVICE CONTROLLER COMPARES THE DEVICE
PERFORMANCE ATTRIBUTES WITH STORED
DATA VOLUME PERFORMANCE ATTRIBUTES
TO DETERMINE IF A SUITABLE MATCH EXISTS ⟋640

MATCH EXISTS          MATCH DOES NOT EXIST

650 ⟍
THE DEVICE CONTROLLER REPORTS
THE SUITABLE DATA VOLUME
TO THE HOST SOFTWARE

680 ⟋
THE DEVICE CONTROLLER REPORTS
TO THE HOST SOFTWARE THAT
THERE IS NO SUITABLE DATA VOLUME

660 ⟍
THE HOST SOFTWARE REPORTS THE
SUITABLE DATA VOLUME TO THE
APPLICATION MANAGEMENT SOFTWARE

690 ⟋
THE HOST SOFTWARE REPORTS TO THE
APPLICATION MANAGEMENT SOFTWARE
THAT THERE IS NO SUITABLE DATA VOLUME

670 ⟍
THE APPLICATION MANAGEMENT SOFTWARE
ASSIGNS APPLICATION DATA TO BE STORED
ON THE SUITABLE DATA VOLUME

*FIG. 6*

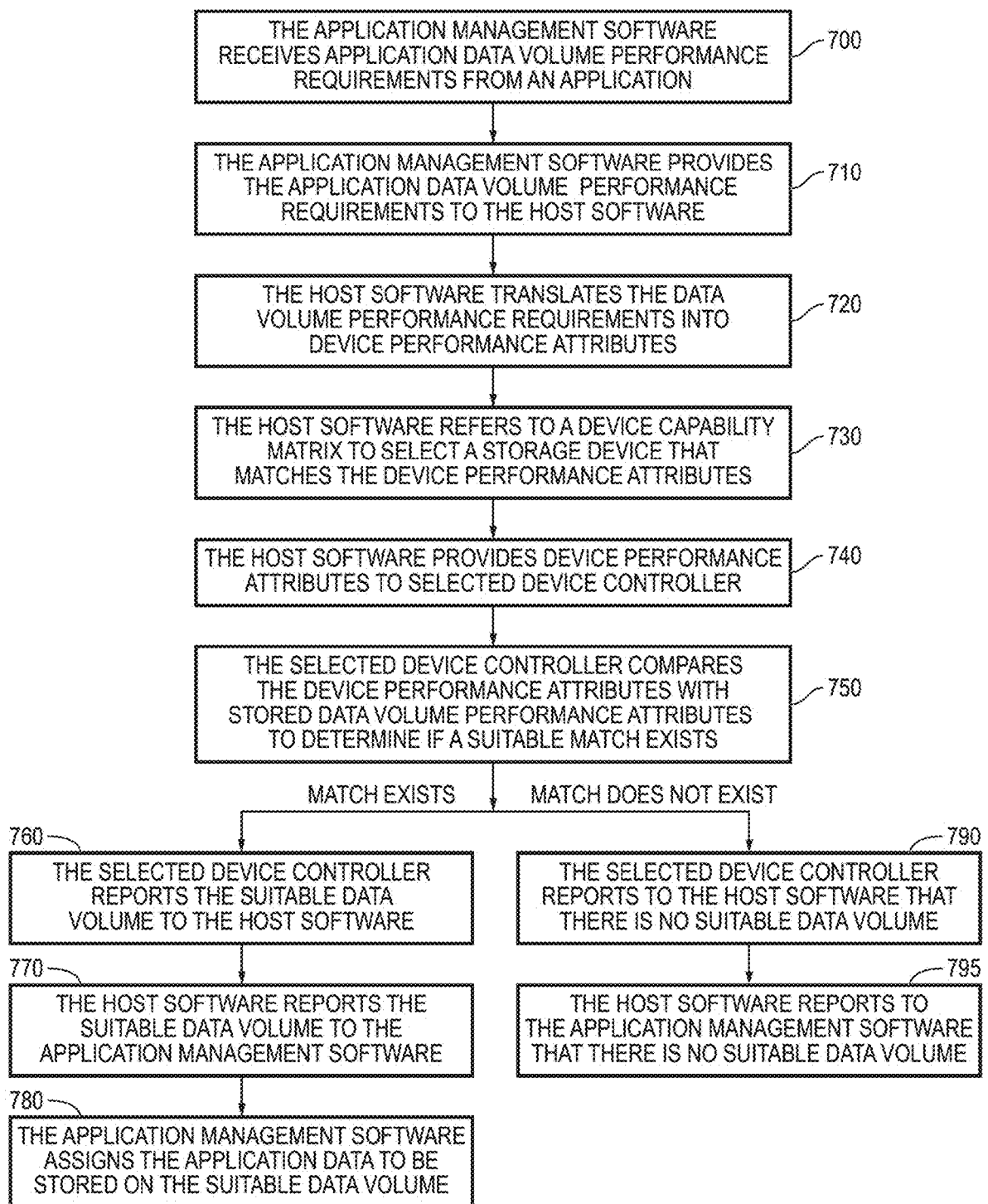

THE APPLICATION MANAGEMENT SOFTWARE
RECEIVES APPLICATION DATA VOLUME PERFORMANCE
REQUIREMENTS FROM AN APPLICATION — 700

THE APPLICATION MANAGEMENT SOFTWARE PROVIDES
THE APPLICATION DATA VOLUME PERFORMANCE
REQUIREMENTS TO THE HOST SOFTWARE — 710

THE HOST SOFTWARE TRANSLATES THE DATA
VOLUME PERFORMANCE REQUIREMENTS INTO
DEVICE PERFORMANCE ATTRIBUTES — 720

THE HOST SOFTWARE REFERS TO A DEVICE CAPABILITY
MATRIX TO SELECT A STORAGE DEVICE THAT
MATCHES THE DEVICE PERFORMANCE ATTRIBUTES — 730

THE HOST SOFTWARE PROVIDES DEVICE PERFORMANCE
ATTRIBUTES TO SELECTED DEVICE CONTROLLER — 740

THE SELECTED DEVICE CONTROLLER COMPARES
THE DEVICE PERFORMANCE ATTRIBUTES WITH
STORED DATA VOLUME PERFORMANCE ATTRIBUTES
TO DETERMINE IF A SUITABLE MATCH EXISTS — 750

MATCH EXISTS                MATCH DOES NOT EXIST

760 —
THE SELECTED DEVICE CONTROLLER
REPORTS THE SUITABLE DATA
VOLUME TO THE HOST SOFTWARE

790
THE SELECTED DEVICE CONTROLLER
REPORTS TO THE HOST SOFTWARE THAT
THERE IS NO SUITABLE DATA VOLUME

770 —
THE HOST SOFTWARE REPORTS THE
SUITABLE DATA VOLUME TO THE
APPLICATION MANAGEMENT SOFTWARE

795
THE HOST SOFTWARE REPORTS TO
THE APPLICATION MANAGEMENT SOFTWARE
THAT THERE IS NO SUITABLE DATA VOLUME

780 —
THE APPLICATION MANAGEMENT SOFTWARE
ASSIGNS THE APPLICATION DATA TO BE
STORED ON THE SUITABLE DATA VOLUME

*FIG. 7*

NON-VOLATILE MEMORY STORAGE DEVICE CAPABLE OF SELF-REPORTING PERFORMANCE CAPABILITIES

CROSS-REFERENCE TO RELATED APPLICATION(S)

The present application is a continuation of U.S. patent application Ser. No. 17/227,998, filed on Apr. 12, 2021, which is a continuation of U.S. patent application Ser. No. 15/588,567, filed on May 5, 2017, now U.S. Pat. No. 11,003,381, which claims priority to and the benefit of U.S. Provisional Application No. 62/468,262, filed Mar. 7, 2017, the entire contents of all of which are incorporated herein by reference.

FIELD

One or more aspects of embodiments according to the present invention relate to non-volatile memory storage devices, and more particularly, to non-volatile memory storage devices capable of self-reporting performance capabilities.

BACKGROUND

Non-volatile memory express (NVMe) solid state drives (SSDs) provide device level information through identify controller and identify namespace commands. This provides device resource information such as the capacity of the SSD, number of namespaces, hardware queues, etc. Typical host software uses this information for capacity planning in mapping application storage capacity requirements to SSDs. However, no such information is available to host software to manage application performance requirements. In the absence of it, host software uses out-of-band information such as performance capabilities as listed in the datasheets.

Different SSD models may support different performance levels; in addition, even for a given SSD model, the performance may vary by the capacity of the device. Host software usually maintains a database of multiple tuples made up of <device model, capacity, performance>, and provides lookup services on the database. Also, the host software incurs additional complexity in maintaining updated database records of drive performance capabilities as the system configuration changes during the life of the system by the addition/deletion of drives.

As SSDs wear out, their performance capabilities are known to degrade. This may make datasheet based performance planning unreliable.

Typical SSD datasheets list aggregate performance of latency, random IOPS and sequential throughput at the device level. However, for SSDs that support more than one namespace per device, the aggregate performance as listed in the datasheet will become less useful in mapping application level performance requirements to namespaces.

SUMMARY

Aspects of embodiments according to the present invention relate to non-volatile memory storage devices capable of self-reporting performance capabilities. According to an embodiment of the present invention, a storage device includes a device controller and a plurality of non-volatile storage media with different performance capabilities. The device controller tracks and stores performance capabilities of the plurality of non-volatile storage media. The device controller provides the performance capabilities and changes to the performance capabilities to host software.

According to an embodiment of the present invention, there is provided a storage device including a first non-volatile storage media having first performance capabilities; a second non-volatile storage media having second performance capabilities different from the first performance capabilities; and a device controller configured to report to a host software the first performance capabilities, the second performance capabilities, changes to the first performance capabilities, and changes to the second performance capabilities.

The storage device may be an NVMe SSD.

The device controller may be further configured to: detect the changes to the first performance capabilities; and report the changes to the first performance capabilities to the host software via an asynchronous event.

The device controller may be further configured to report the first performance capabilities and the second performance capabilities by: gathering device parameters to calibrate device performance; calculating the first performance capabilities and the second performance capabilities; and notifying the host software of the first performance capabilities and the second performance capabilities.

The device controller may report the first performance capabilities and the second performance capabilities when a calibration request is received, at the device controller, from the host software.

The device controller may be further configured to: monitor the first non-volatile storage media for the changes to the first performance capabilities; monitor the second non-volatile storage media for the changes to the second performance capabilities; and detect the changes to the first performance capabilities or the changes to the second performance capabilities and when the changes to the first performance capabilities or the changes to the second performance capabilities are detected: gather device parameters to calibrate device performance; calculate the first performance capabilities and the second performance capabilities; and notify the host software of the changes to the first performance capabilities or the changes to the second performance capabilities.

According to an embodiment of the present invention, there is provided a method of reporting performance capabilities to a host software from a storage device, the storage device including a device controller and one or more non-volatile memory (NVM) blocks, the method including: gathering, by the device controller, device parameters to calibrate device performance; calculating, by the device controller, device performance attributes; and notifying, by the device controller, the host software of the device performance attributes.

The method may be performed when a calibration request is received, at the device controller, from the host software.

The method may further include monitoring, by the device controller, the storage device for changes in the device performance attributes.

The gathering, the calculating, and the notifying may be performed when a change in performance attributes is detected by the device controller.

The notifying may be done by an asynchronous event.

The monitoring may be performed after the device controller receives a registration for performance change notifications from the host software.

According to an embodiment of the present invention, there is provided a method of assigning, by host software, data, having data volume performance requirements, to a suitable non-volatile memory express (NVMe) namespace profile of one or more NVMe namespace profiles, the method including: receiving, at the host software, the data volume performance requirements; translating, by the host software, the data volume performance requirements into device performance attributes; comparing, by the host software, the device performance attributes with performance attributes of the one or more NVMe namespace profiles to determine which, if any, of the one or more NVMe namespace profiles is the suitable NVMe namespace profile; and when it is determined that at least one of the one or more NVMe namespace profiles is the suitable NVMe namespace profile, assigning, by the host software, the data to be stored in the suitable NVMe namespace profile.

When it is determined that none of the one or more NVMe namespace profiles is the suitable NVMe namespace profile, the method may further include: comparing, by the host software, the device performance attributes with a device capability matrix storing device performance attributes of a plurality of storage devices to determine which resources of the plurality of storage devices to assign to a new NVMe namespace profile that meets the data volume performance requirements; creating, by the host software, the new NVMe namespace profile by assigning suitable resources of the plurality of storage devices to the new NVMe namespace profile; and assigning, by the host software, the data to be stored in the new NVMe namespace profile.

Each of the plurality of storage devices may include more than one type of non-volatile memory (NVM) data blocks.

The suitable resources may include resources from more than one of the plurality of storage devices.

The method may further include, prior to comparing the device performance attributes with the device capability matrix: requesting, by the host software and from the plurality of storage devices, updated device performance attributes; and updating the device capability matrix.

When it is determined that more than one of the one or more NVMe namespace profiles is the suitable NVMe namespace profile, the data may be assigned to be stored in the suitable NVMe namespace profile having performance attributes closest to the device performance attributes.

The host software may receive the data volume performance requirements and the data from an application included in a host system, the host system further including the host software.

The host system may further include a plurality of storage devices.

BRIEF DESCRIPTION OF THE DRAWINGS

These and other features and aspects of the present invention will be appreciated and understood with reference to the specification, claims, and appended drawings wherein:

FIG. 6 is a flow chart illustrating a method of checking for a suitable data volume according to an embodiment of the present invention;

FIG. 7 is a flow chart illustrating another method of checking for a suitable data volume according to an embodiment of the present invention;

DETAILED DESCRIPTION

Aspects of embodiments according to the present invention relate to non-volatile memory (NVM) storage devices capable of self-reporting performance capabilities. According to an embodiment of the present invention, a storage device includes a device controller and a plurality of non-volatile storage media with different performance capabilities. The device controller tracks and stores performance capabilities of the plurality of non-volatile storage media. The device controller provides the performance capabilities and changes to the performance capabilities to host software.

The detailed description set forth below in connection with the appended drawings is intended as a description of exemplary embodiments of refresh aware replacement policies for volatile memory caches provided in accordance with the present invention and is not intended to represent the only forms in which the present invention may be constructed or utilized. The description sets forth the features of the present invention in connection with the illustrated embodiments. It is to be understood, however, that the same or equivalent functions and structures may be accomplished by different embodiments that are also intended to be encompassed within the spirit and scope of the invention. As denoted elsewhere herein, like element numbers are intended to indicate like elements or features.

Embodiments of the present invention provide a method in which a non-volatile memory (NVM) storage device (e.g., a solid state drive (SSD)) will have embedded logic to assist host software in mapping application performance requirements to the NVM storage device.

While descriptions herein may use the term "requirements" (e.g., application mapping requirements), it is not intended that these "requirements" be necessary conditions, although they can be. For example, the term "requirements" may refer to ideal conditions, optimal conditions, suggested conditions, minimum conditions, maximum conditions, preset conditions, recommended conditions, normal conditions, and/or the like.

Embodiments of the present invention define new device level features to present performance capabilities to host software layers, and methods to alert the host software of any changes. Embodiments of the present invention define new device level features to intelligently assign device resources to namespace profiles communicated by the host software.

Embodiments of the present invention define new host software methods to leverage these new device level features in building simplified software to optimally match application performance requirements to the NVM storage device, and define performance profile at a finer granular level. Embodiments of the present invention can manage heterogeneous storage devices with different performance capabilities in a storage system.

Figure 1:
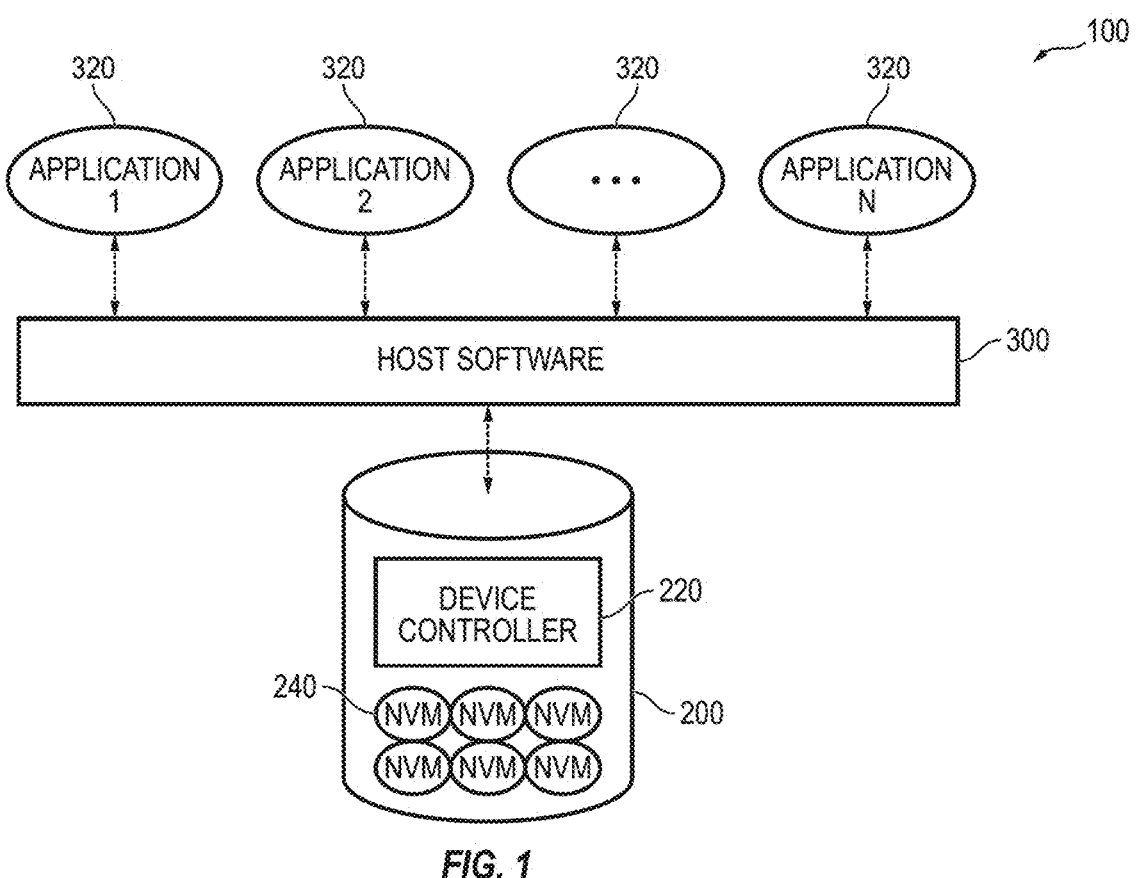
FIG. 1 is a block diagram of a computer system according to an embodiment of the present invention.

FIG. 1 is a block diagram of a computer system according to an embodiment of the present invention. Referring to FIG. 1, a computer system 100 includes a non-volatile memory (NVM) storage device 200, host software 300, and one or more applications 320. The NVM storage device 200 includes a device controller 220 and NVM data blocks 240 (e.g., NVM blocks 240). The one or more applications 320 may include N (N is an integer) applications (e.g., Application 1, Application 2, . . . Application N).

The one or more applications 320 may have differing application data volume performance requirements (e.g., data read and write requirements) for optimal performance. When all of the data for all of the one or more applications 320 are stored within the same type of data blocks, the data volume performance characteristics may be higher than optimal, lower than optimal, or optimal. When the data volume performance characteristics are too low, the one or more applications 320 may not be able to perform optimally. When the data volume performance characteristics are higher than the optimal for the one or more applications 320, a cost for the storage device may be unduly increased.

According to embodiments of the present invention, the one or more applications 320 may provide their application data volume performance requirements directly to the host software 300. According to other embodiments of the present invention, the applications may provide their application data volume performance requirements to application management software which manages the application data for the host software 300.

When the host software 300 (or the application management software) receives a request to find data volume performance characteristics matching needs of an application 320 (or applications 320), the host software 300 translates the data volume performance characteristics into device performance attributes.

Figure 4:
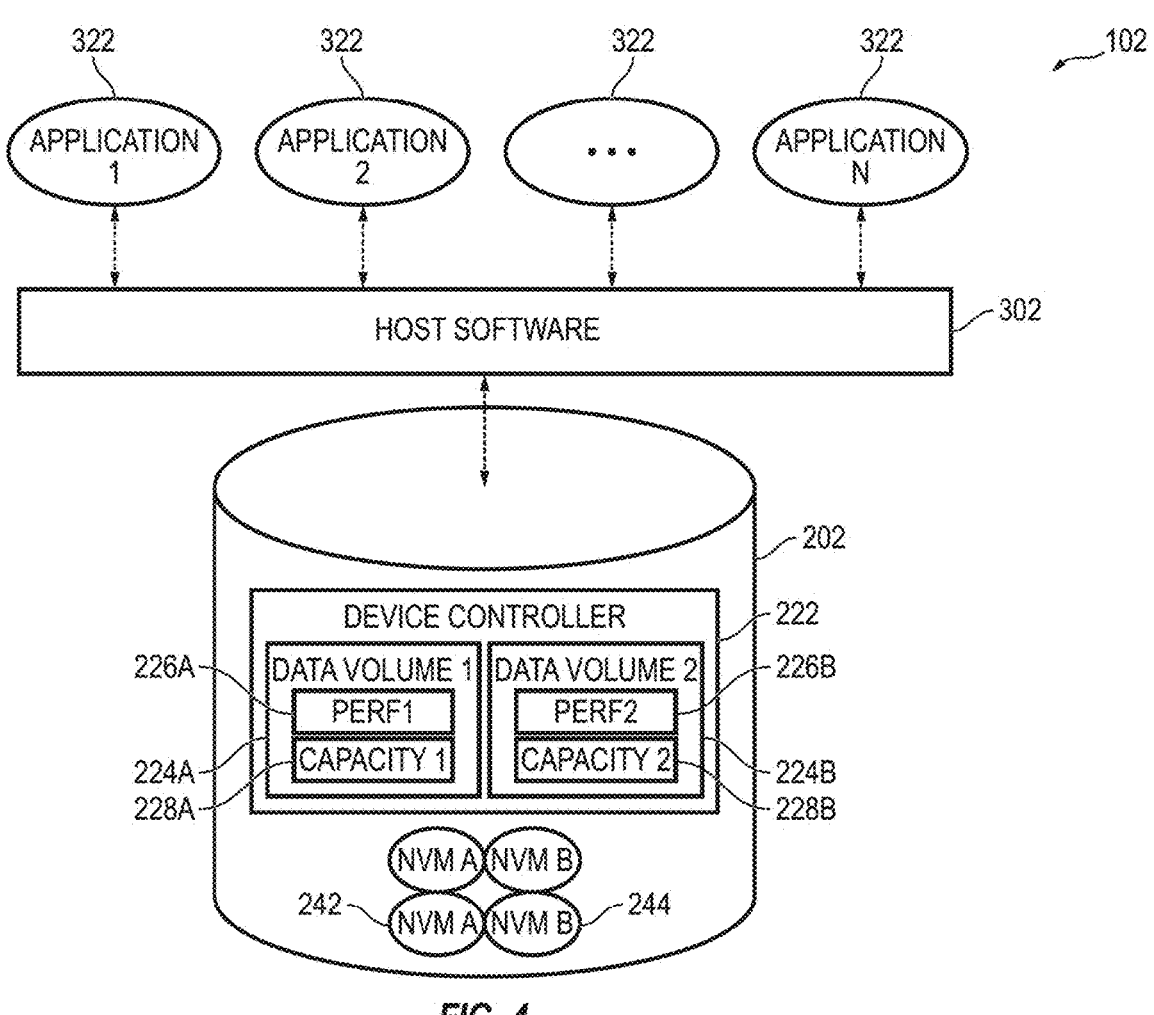
FIG. 4 is a block diagram of a computer system according to another embodiment of the present invention.

The host software 300 may maintain a database storing the device performance attributes for each of the NVM blocks 240 and/or one or more data volumes (see FIG. 4). Alternatively, the device controller 220 may maintain a database storing the device performance attributes for each of the NVM blocks 240 and/or one or more data volumes (see FIG. 4).

According to some embodiments, after the host software 300 translates the data volume performance characteristics into device performance attributes, the host software 300 compares the translated device performance attributes with the device performance attributes stored in the database maintained by the host software 300 to determine if a suitable NVM block 240 is available. In determining if a suitable match is available, the host software 300 may consider read speed, write speed, capacity, etc. According to some embodiments, the host software 300 may determine that a suitable NVM block 240 is available only if there is an NVM block 240 that meets or exceeds all of the device performance attributes. According to other embodiments, the host software 300 may determine that a suitable NVM block 240 is available when there is an NVM block 240 that meets or exceeds some or most of the device performance attributes. According to still other embodiments, the host software 300 may determine that a suitable NVM block 240 is available when there is an NVM block 240 that has a certain percentage or above (e.g., 90% or 95%) for each of the device performance attributes.

When there is more than one suitable NVM block 240, the host software 300 may select the NVM block 240 with the closest device performance attributes to the translated device performance attributes, but the present invention is not limited thereto and, for example, the host software 300 may select the NVM block 240 with the highest available storage space, lowest available storage space, highest capacity, lowest capacity, highest read speed, lowest read speed, highest write speed, lowest write speed, and/or the like.

When the host software 300 includes the application management software, the host software 300 may notify the application management software of the suitable NVM block 240.

According to other embodiments, after the host software 300 translates the data volume performance characteristics into device performance attributes, the host software 300 provides the device performance attributes and a request to find a matching NVM block 240 to the device controller 220. The device controller 220 then compares the translated device performance attributes with the device performance attributes stored in the database maintained by the device controller 220 to determine if a suitable NVM block 240 is available. In determining if a suitable match is available, the device controller 220 may consider read speed, write speed, capacity, etc. According to some embodiments, the device controller 220 may determine that a suitable NVM block 240 is available only if there is an NVM block 240 that meets or exceeds all of the device performance attributes. According to other embodiments, the device controller 220 may determine that a suitable NVM block 240 is available when there is an NVM block 240 that meets or exceeds some or most of the device performance attributes. According to still other embodiments, the device controller 220 may determine that a suitable NVM block 240 is available when there is an NVM block 240 that has a certain percentage or above (e.g., 90% or 95%) for each of the device performance attributes.

When there is more than one suitable NVM block 240, the device controller 220 may select the NVM block 240 with device performance attributes closest to the translated device performance attributes, but the present invention is not limited thereto and, for example, the device controller 220 may select the NVM block 240 with the highest available storage space, lowest available storage space, highest capacity, lowest capacity, highest read speed, lowest read speed, highest write speed, lowest write speed, and/or the like.

The device controller 220 notifies the host software 300 whether or not there is a suitable NVM block 240 available. If there is a suitable NVM block 240 available, the device controller 220 also notifies the host software 300 which of the NVM blocks 240 the device controller 220 selected.

When the host software 300 includes the application management software, the host software 300 may notify the application management software of the suitable NVM block 240.

As such, based on the device capabilities, the host software 300 or the device controller 220 can map the device to meet application capacity requirements.

The host software 300 may use standard defined interfaces (e.g., in the case of SCSI, it may be an SCSI INQUIRY command; in the case of non-volatile memory express (NVMe), it may be Identify Controller and Identify Namespace commands) to communicate with the device controller. However, the existing interfaces do not provide any information about performance attributes of the device.

According to some embodiments of the present invention, the NVM storage device 200 may be a solid state drive (SSD), a hard disk drive (HDD), or a hybrid SSD-HDD, but the present invention is not limited thereto. Any suitable non-volatile data storage device may be used as the NVM storage device 200. The NVM data blocks 240 may be flash memory, but the present invention is not limited thereto.

Figure 2:
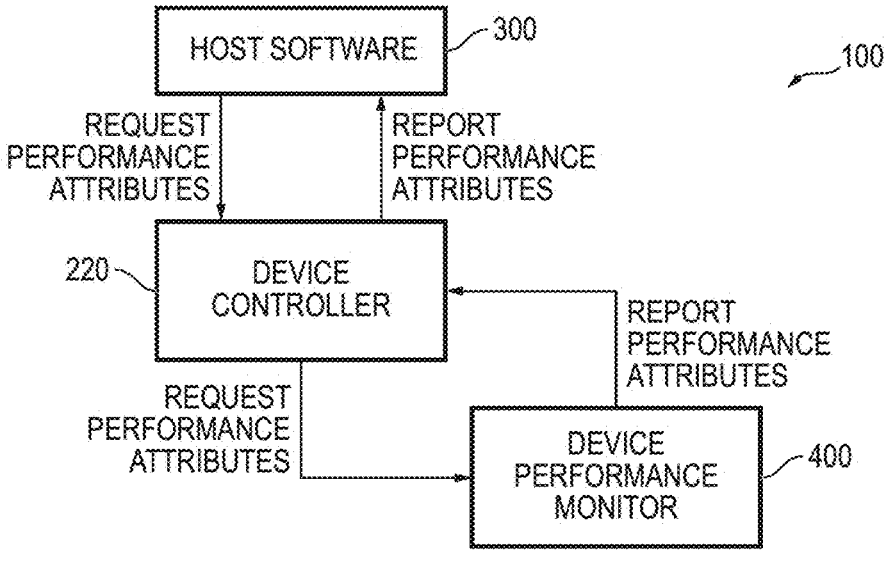
FIG. 2 is a block diagram of a computer system according to the embodiment of FIG. 1.

FIG. 2 is a block diagram of a computer system according to the embodiment of FIG. 1. FIG. 2 illustrates a method for host software 300 to request performance attributes and for the host software 300 to receive a report of the performance attributes. The device controller 220 may use such a mechanism to report the performance attributes to the host software 300.

The host software 300 may request performance attributes from the device controller 220. The host software 300 may request the performance attributes at start-up, when the host software detects some change in the NVM storage device 200 (see FIG. 1), after a set amount of time, and/or the like.

The NVM storage device 200 may include the device controller 220 and a device performance monitor 400. The device performance monitor 400 may be a part of the device controller 220 or may be separate from the device controller 220.

When the device controller 220 receives the request for performance attributes from the host software, the device controller 220 may request the performance attributes from the device performance monitor 400.

The device performance monitor 400 may monitor the performance of the NVM blocks 240 (see FIG. 1). According to an embodiment of the present invention, the device performance monitor 400 may monitor the NVM blocks 240 according to a monitoring scheme. The monitoring scheme may be continuously monitoring the NVM blocks 240, monitoring the NVM blocks 240 on a set schedule, randomly monitoring the NVM blocks 240, and/or the like.

According to an embodiment of the present invention, when the device performance monitor 400 receives the request for performance attributes, the device performance monitor 400 may determine the current (or the latest) device performance attributes acquired based on any of the above mentioned monitoring schemes. According to another embodiment of the present invention, when the device performance monitor 400 receives the request for the device performance attributes, the device performance monitor 400 may poll or test the NVM blocks 240 in order to determine the current device performance attributes.

When the device performance monitor 400 has determined the current device performance attributes, the device performance monitor 400 reports the current device performance attributes to the device controller 220.

When the device controller 220 receives the current device performance attributes, the device controller 220 reports the current device performance attributes to the host software 300.

Figure 3:
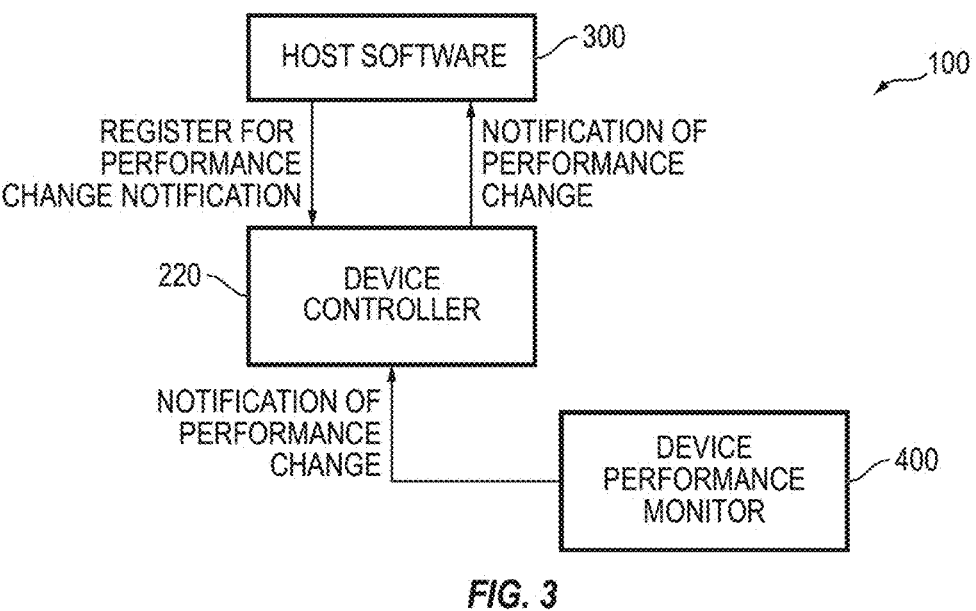
FIG. 3 is another block diagram of a computer system according to the embodiment of FIG. 1.

FIG. 3 is another block diagram of a computer system according to the embodiment of FIG. 1. FIG. 3 illustrates a method for host software 300 to register for dynamic performance change notifications and for the host software 300 to receive dynamic performance change notifications. The device controller 220 may use such a mechanism to alert the host software 300 of any significant changes to the device performance.

The host software 300 may register to receive performance change notifications from the device controller 220. For example, the host software 300 may send a registration request for performance change notifications to the device controller 220. The host software 300 may request that changes (e.g., significant changes) to the performance attributes of the NVM block 240 (see FIG. 1) be reported by asynchronous events. Asynchronous events are those occurring independent of the main program flow. These events are executed in a non-blocking scheme, allowing the main program flow to continue.

The NVM storage device 200 may include the device controller 220 and a device performance monitor 400. The device performance monitor 400 may be a part of the device controller 220 or may be separate from the device controller 220.

The device performance monitor 400 may monitor the performance of the NVM blocks 240. According to an embodiment of the present invention, the device performance monitor 400 may monitor the NVM blocks 240 according to a monitoring scheme. The monitoring scheme may be continuously monitoring the NVM blocks 240, monitoring the NVM blocks 240 on a set schedule, randomly monitoring the NVM blocks 240, and/or the like.

When the device performance monitor 400 has determined that a significant change in the device performance attributes has occurred, the device performance monitor 400 notifies the device controller 220 that a change has occurred and notifies the device controller 220 of the current device performance attributes.

When the device controller 220 receives the notification of the change to the device performance attributes, the device controller 220 reports the current device performance attributes to the host software 300 via an asynchronous event.

FIG. 4 is a block diagram of a computer system according to another embodiment of the present invention. Referring to FIG. 4, a computer system 102 includes a non-volatile memory (NVM) storage device 202, host software 302, and one or more applications 322. The NVM storage device 202 includes a device controller 222, first NVM data blocks 242, and second NVM data blocks 244. The device controller 222 may include a first data volume (or a first performance profile) and a second data volume (or a second performance profile). Each of the data volumes may include information about the NVM data blocks assigned to it. For example, each of the data volumes may include information about the data volume's performance characteristics (226A and 226B) and the capacity (228A and 228B) of the NVM data blocks assigned to the data volume. The one or more applications 322 may include N (N is an integer) applications (e.g., Application 1, Application 2, . . . Application N).

While FIG. 4 shows an NVM storage device 202 having only two data volumes (the first data volume 224A and the second data volume 224B) and only two types of NVM data blocks (the first NVM data blocks 242 and the second NVM data blocks 244), the present invention is not limited thereto. For example, the NVM storage device 202 may have more than two data volumes and/or more than two types of NVM data blocks.

The one or more applications 322 may have differing application data volume performance requirements (e.g., data read and write requirements) for optimal performance. When all of the data for all of the one or more applications 322 are stored within the same type of data blocks, the data volume performance characteristics may be higher than optimal, lower than optimal, or optimal. When the data volume performance characteristics are too low, the one or more applications 322 may not be able to perform optimally. When the data volume performance characteristics are higher than the optimal for the one or more applications 322, a cost for the storage device may be unduly increased.

According to embodiments of the present invention, the one or more applications 322 may provide their application data volume performance requirements directly to the host software 302. According to other embodiments of the present invention, the applications may provide their application data volume performance requirements to application management software which manages the application data for the host software 302.

The host software 302 may maintain a database storing the data volume performance characteristics for the first data volume 224A and the second data volume 224B. Alternatively, the device controller 220 may maintain a database storing the data volume performance characteristics for the first data volume 224A and the second data volume 224B.

According to an embodiment of the present invention, when the host software 302 (or the application management software) receives a request to find data volume performance characteristics matching needs of an application 320 (or applications 320), the host software 302 compares the required data volume performance characteristics with the data volume performance characteristics stored in the database maintained by the host software 302 to determine if a suitable data volume is available. In determining if a suitable match is available, the host software 302 may consider read speed, write speed, capacity, etc. According to some embodiments, the host software 302 may determine that a suitable data volume is available only if there is a data volume that meets or exceeds all of the data volume performance characteristics. According to other embodiments, the host software 302 may determine that a suitable data volume is available when there is a data volume that meets or exceeds some or most of the data volume performance characteristics. According to still other embodiments, the host software 302 may determine that a suitable data volume is available when there is a data volume that has a certain percentage or above (e.g., 90% or 95%) for each of the device performance attributes.

When there is more than one suitable data volume, the host software 302 may select the data volume with the closest data volume performance characteristics to the required data volume performance characteristics, but the present invention is not limited thereto and, for example, the host software 302 may select the data volume with the highest available storage space, lowest available storage space, highest capacity, lowest capacity, highest read speed, lowest read speed, highest write speed, lowest write speed, and/or the like.

When the host software 302 includes the application management software, the host software 302 may notify the application management software of the suitable data volume.

According to other embodiments, when the host software 302 (or the application management software) receives a request to find data volume performance characteristics matching needs of an application 322 (or application 322), the host software 302 provides required data volume performance characteristics and a request to find a matching data volume to the device controller 222. The device controller 222 then compares the required data volume performance characteristics with the data volume performance characteristics stored in the database maintained by the device controller 222 to determine if a suitable data volume is available. In determining if a suitable match is available, the device controller 222 may consider read speed, write speed, capacity, etc. According to some embodiments, the device controller 222 may determine that a suitable data volume is available only if there is a data volume that meets or exceeds all of the data volume performance characteristics. According to other embodiments, the device controller 222 may determine that a suitable data volume is available when there is a data volume that meets or exceeds some or most of the data volume performance characteristics. According to still other embodiments, the device controller 222 may determine that a suitable data volume is available when there is a data volume that has a certain percentage or above (e.g., 90% or 95%) for each of the data volume performance characteristics.

When there is more than one suitable data volume, the device controller 222 may select the data volume with data volume performance characteristics closest to the required data volume performance characteristics, but the present invention is not limited thereto and, for example, the device controller 222 may select the data volume with the highest available storage space, lowest available storage space, highest capacity, lowest capacity, highest read speed, lowest read speed, highest write speed, lowest write speed, and/or the like.

The device controller 222 notifies the host software 302 whether or not there is a suitable data volume available. If there is a suitable data volume available, the device controller 222 also notifies the host software 302 which of the data volumes the device controller 222 selected.

When the host software 302 includes the application management software, the host software 302 may notify the application management software of the suitable data volume.

As such, based on the device capabilities, the host software 302 or the device controller 222 can map the device's data volumes to meet application capacity requirements.

The host software 302 may use standard defined interfaces (e.g., in the case of SCSI, it may be an SCSI INQUIRY command; in the case of NVMe, it may be Identify Controller and Identify Namespace commands) to communicate with the device controller. However, the existing interfaces do not provide any information of performance attributes of the device.

According to some embodiments of the present invention, the NVM storage device 202 may be a solid state drive (SSD) (e.g., an NVMe SSD), a hard disk drive (HDD), or a hybrid SSD-HDD, but the present invention is not limited thereto. Any suitable non-volatile data storage device may be used as the NVM storage device 202. The NVM data blocks may be flash memory, but the present invention is not limited thereto.

FIG. 4 illustrates a storage device that can support different data volumes (or namespaces) with different performance attributes. The device controller may create independent different data volumes with assigned performance attributes. The device controller may use one or more types of NVM as available in the SSD to meet the performance requirements of data volumes.

According to an embodiment of the present invention, data volumes may have specific performance profiles. As explained, the device controller may calibrate the device's performance capabilities, and it may map the data volume performance requirements to the device performance capabilities. The device controller may accordingly select one or more NVM types and other hardware resources to deliver the performance as specified for the data volume. It will manage bookkeeping of performance capabilities to data volumes actively present on the device controller at any given time, and accordingly may fail requests for new data volumes if it cannot further serve the specified performance specifications.

According to an embodiment of the present invention, the host software may be configured to: translate application management performance specifications into device performance attributes; pass the performance attribute information through a data volume create request to the storage device; process response(s) from the storage device; and respond with success/failure to the application management software.

According to an embodiment of the present invention, the storage device controller may be configured to: process data volume create requests; map data volume performance attributes to underlying NVM capabilities; select one or more NVM types to serve the data volume performance requirements; assign other resources such as hardware queues, buffering memory, etc., to meet the performance requirements; and respond success/failure to the host software.

Figure 5:
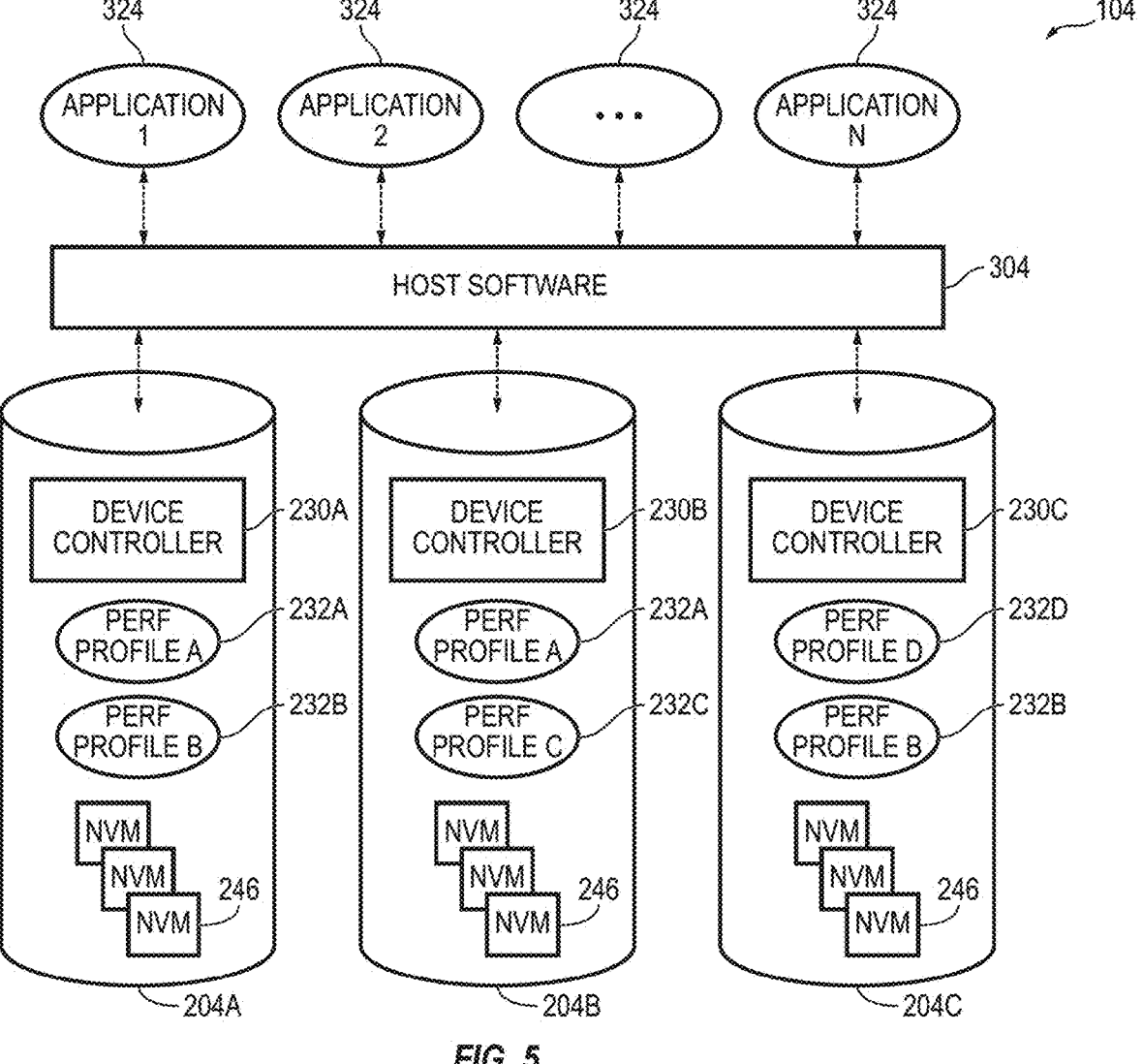
FIG. 5 is a block diagram of a computer system according to another embodiment of the present invention.

FIG. 5 is a block diagram of a computer system according to another embodiment of the present invention. Referring to FIG. 5, a computer system 104 includes a plurality of non-volatile memory (NVM) storage devices (e.g., a first NVM storage device 204A, a second NVM storage device 204B, and a third NVM storage device 204C), host software 304, and one or more applications 324. The NVM storage devices each include a device controller (e.g., a first device controller 230A, a second device controller 230B, and a third device controller 230C), and NVM data blocks 246. The NVM data blocks 246 of each of the NVM storage devices may include only data blocks of a single type, or may include data blocks of a plurality of types. The one or more applications 322 may include N (N is an integer) applications (e.g., Application 1, Application 2, . . . Application N).

The storage devices may each include a plurality of performance profiles. Each performance profile may include information about the NVM data blocks 246 assigned to it. For example, each of the performance profiles may include information about the performance characteristics and the capacity of the NVM data blocks 246 assigned to the performance profile.

While FIG. 5 shows NVM storage devices having only two performance profiles each, the present invention is not limited thereto. For example, the NVM storage devices may have more than two performance profiles each. The same performance profiles may exist on more than one NVM storage device. For example, in FIG. 5, a performance profile A 232A is in both the first NVM storage device 204A and the second NVM storage device 204B, and a performance profile B 232B is in both the first NVM storage device 204A and the third NVM storage device 204C. Further, a performance profile may exist on only one NVM storage device. For example, in FIG. 5, a performance profile C 232C is in only the second NVM storage device 204B, and a performance profile D 232D is in only the third NVM storage device 204C.

The one or more applications 324 may have differing application data volume performance requirements (e.g., data read and write requirements) for optimal performance. When all of the data for all of the one or more applications 324 are stored within the same type of data blocks, the data volume performance characteristics may be higher than optimal, lower than optimal, or optimal. When the data volume performance characteristics are too low, the one or more applications 324 may not be able to perform optimally. When the data volume performance characteristics are higher than the optimal for the one or more applications 324, a cost for the storage device may be unduly increased.

According to embodiments of the present invention, the one or more applications 324 may provide their application performance requirements directly to the host software 304. According to other embodiments of the present invention, the applications may provide their application performance requirements to application management software which manages the application data for the host software 304.

The host software 304 may maintain a database storing the performance characteristics for the performance profiles. Alternatively, the device controller 220 may maintain a database storing the performance characteristics for the performance profiles.

According to an embodiment of the present invention, when the host software 304 (or the application management software) receives a request to find a performance profile matching needs of an application 324 (or applications 324), the host software 304 compares the required performance characteristics with performance characteristics, for the performance profiles, stored in the database maintained by the host software 302 to determine if a suitable performance profile is available. In determining if a suitable match is available, the host software 304 may consider read speed, write speed, capacity, etc. According to some embodiments, the host software 304 may determine that a suitable performance profile is available only if there is a performance profile that meets or exceeds all of the required performance characteristics. According to other embodiments, the host software 304 may determine that a suitable performance profile is available when there is a performance profile that meets or exceeds some or most of the required performance characteristics. According to still other embodiments, the host software 304 may determine that a suitable performance profile is available when there is a performance profile that has a certain percentage or above (e.g., 90% or 95%) for each of the required performance attributes.

When there is more than one suitable performance profile, the host software 304 may select the performance profile with the closest performance characteristics to the required performance characteristics, but the present invention is not limited thereto and, for example, the host software 304 may select the performance profile with the highest available storage space, lowest available storage space, highest capacity, lowest capacity, highest read speed, lowest read speed, highest write speed, lowest write speed, and/or the like.

When the host software 304 includes the application management software, the host software 304 may notify the application management software of the suitable performance profile.

As such, based on the device capabilities, the host software 304 can map the device's performance profile to meet application capacity requirements.

According to some embodiments of the present invention, the NVM storage devices may be a solid state drive (SSD), a hard disk drive (HDD), or a hybrid SSD-HDD, but the present invention is not limited thereto. Any suitable non-volatile data storage device may be used as the NVM storage devices. The NVM data blocks may be flash memory, but the present invention is not limited thereto.

The host software 304 may use standard defined interfaces (e.g., in the case of SCSI, it may be an SCSI INQUIRY command; in the case of NVMe, it may be Identify Controller and Identify Namespace commands) to communicate with the device controller. However, the existing interfaces do not provide any information of performance attributes of the device.

FIG. 5 illustrates the host software that manages three different storage devices, each supporting different performance profiles. As shown, the host software can have several applications with different performance profiles sharing the same storage device resource pool. The host software may create data volumes on appropriate storage devices for each of the applications to match their respective performance profiles.

According to an embodiment of the present invention, the host software may be configured to: translate application management performance specifications into device performance attributes; refer to the device performance capability matrix to select one or more devices that match the application performance requirements; pass the performance attribute information through a data volume create request to the storage device; process response(s) from the storage device; and respond with success/failure to the application management software.

According to an embodiment of the present invention, the host software may be further configured to: gather device performance capabilities for all the devices actively present in the system during initialization time and/or handling device hot-plug events; and update the drive performance capability matrix to data volumes as needed.

According to an embodiment of the present invention, the storage device controller may be configured to: process data volume create requests; map data volume performance attributes to underlying NVM capabilities; select one or more NVM types to serve the data volume performance requirements; assign other resources such as hardware queues, buffering memory, etc., to meet the performance requirements; and respond success/failure to the host software.

According to an embodiment of the present invention, the storage device controller may be further configured to: calibrate the device's performance capabilities during initialization and as requested by the host software (e.g., via a calibration request); update the drive performance capability matrix; and notify the host software about performance capabilities as needed.

Referring to the embodiments of FIGS. 1-5, the response to device identification command may return, in vendor specific fields and/or additional fields that can be defined, information about different NVM types and performance attributes.

The device may provide additional information such as device capabilities. The capabilities may include: NVM attribute information; device performance capability information; a list of device performance attributes; dynamic calibration of performance capabilities; changes in device performance attributes; and/or the like.

Host software may first probe the device about the device capabilities. On devices that support the device capabilities mentioned above, the host software may further probe for additional device information that it can use to map application workloads to storage media.

Additionally, NVM attribute information may include: a number of NVM types present in each storage device; an NVM description in ASCII text; an NVM capacity within the device; NVM performance characteristics as relevant to the NVM type and device implementation; and/or the like.

The device performance capability information may include: random read IOPS for IOs of different IO sizes; random write IOPS for IOs of different IO sizes; sequential read bandwidth (BW) for IOs of different IO sizes; sequential write BW for IOs of different IO sizes; random read latency for IOs of different IO sizes; random write latency for IOs of different IO sizes; the above performance attributes under different IO workload conditions, including but not limited to 100% read, 100% write, mixed workload, etc. while the device is being exercised by one or more different applications; projected performance levels as a measure of % life remaining at the NVM and at different over provisioning levels, as applicable to the NVM type(s) used in the SSD; and/or the like.

The device may provide this information for the whole device and/or at a sub-granularity such as namespace in an NVMe device. A set of such performance attributes can be grouped under a performance profile that can be easily exchanged from applications to host software to storage devices.

The device controller may calibrate the performance as a measure of various device attributes, for example: controller internal capabilities; host interface capabilities; NVM interface capabilities; NVM capabilities; overprovisioning levels configured on the SSD; other relevant parameters that affect the storage device performance; and/or the like.

Controller internal capabilities include: bus widths and rates; IO processing capabilities; parallel IO processing capabilities; performance specifications as allowed by device firmware, if applicable; other attributes that would impact performance; and/or the like.

Host interface capabilities include: performance error rates seen on the physical links (as allowed by the connected host interface and what the physical links are trained to at the given time); latency jitter rate experienced on the physical links; link attributes such as MTU, burst rates, pre-fetch cache, etc.; and/or the like.

NVM interface capabilities include: number of parallel memory channels available for serving read/write IOs; speed of memory channels; other relevant attributes that would impact performance; and/or the like.

NVM capabilities include, for each different type of NVM type in the SSD: read and write IO rates of aggregate NVM in the SSD; read and write IO latency of aggregate NVM in the SSD; an amount of NVM that is available at the given time, accounting for failed or quarantined memory modules in the SSD; and/or the like. NVM capabilities further include memory error rates experienced; other relevant attributes that would impact performance; and/or the like.

There are several methods of calibrating performance attributes listed above as a function of device parameters listed above. An example method is: sequential read/write throughput is equal to the minimum of the following attributes: effective bandwidth of the rate to which the host interface of the storage device has been trained; the number of memory channels available for processing large IOs; and an effective bandwidth of bus widths in the controller.

According to an embodiment of the present invention, the host software probes device performance capabilities using the new interfaces as described above. The host software maintains records of all the storage devices it is managing in the system and their respective performance capabilities. In addition, it also registers and handles dynamic performance changes reporting by storage devices from those that support such asynchronous events.

According to an embodiment of the present invention, with regard to the application performance requirements, the host software maintains records of all data volume requests received from application management software and a history of how they have been mapped to the underlying storage devices. Based on the performance and capacity requirements of the application data volumes, the host software selects the appropriate storage device(s) and creates data volume(s).

In addition, the host software may maintain typical bookkeeping operations about the performance specifications created and observed, real time use of the applications to adjust the over subscription ratios, etc.

FIG. 6 is a flow chart illustrating a method of checking for a suitable data volume (or a suitable namespace profile) according to an embodiment of the present invention. The application management software receives application data volume performance requirements from an application (600). The application management software provides the application data volume performance requirements to the host software (610). The host software translates the data volume performance requirements into device performance attributes (620). The host software provides the device performance attributes to the device controller (630). The device controller compares the device performance attributes with stored data volume performance attributes to determine if a suitable match exists (640).

If a suitable match exists, the device controller reports the suitable data volume to the host software (650). The host software reports the suitable data volume to the application management software (660). The application management software assigns application data to be stored on the suitable data volume (670).

If a suitable match does not exist, the device controller reports to the host software that there is no suitable data volume (680). The host software reports to the application management software that there is no suitable data volume (690).

FIG. 7 is a flow chart illustrating another method of checking for a suitable data volume according to an embodiment of the present invention. The application management software receives application data volume performance requirements from an application (700). The application management software provides the application data volume performance requirements to the host software (710). The host software translates the data volume performance requirements into device performance attributes (720). The host software refers to a device capability matrix to select a storage device that matches the device performance attributes (730). The host software provides the device performance attributes to the selected device controller (740). The selected device controller compares the device performance attributes with stored data volume performance attributes to determine if a suitable match exists (750).

If a suitable match exists, the selected device controller reports the suitable data volume to the host software (760). The host software reports the suitable data volume to the application management software (770). The application management software assigns application data to be stored on the suitable data volume (780).

If a suitable match does not exist, the selected device controller reports to the host software that there is no suitable data volume (790). The host software reports to the application management software that there is no suitable data volume (795).

Figure 8:
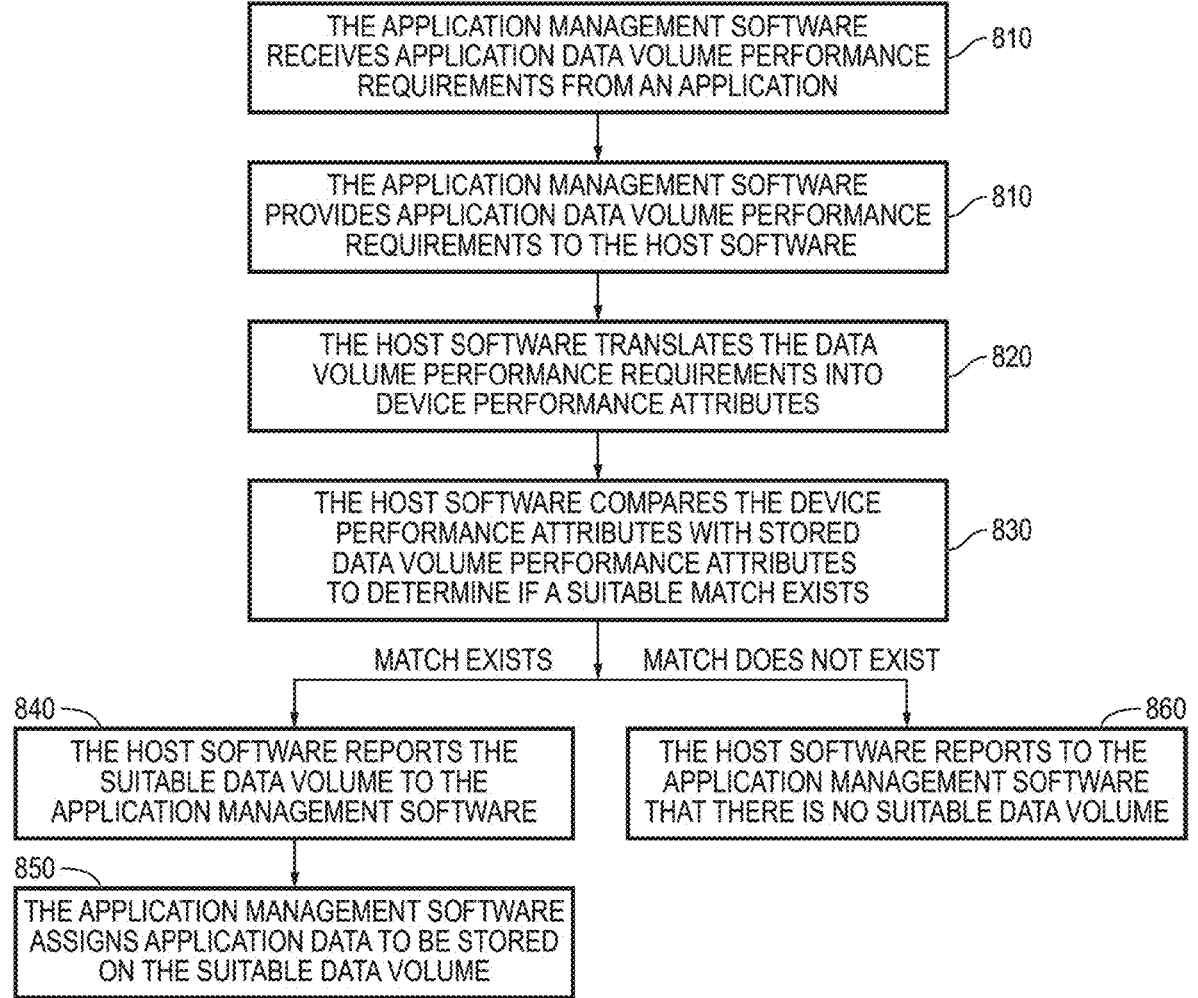
FIG. 8 is a flow chart illustrating another method of checking for a suitable data volume according to an embodiment of the present invention.

FIG. 8 is a flow chart illustrating another method of checking for a suitable data volume according to an embodiment of the present invention. The application management software receives application data volume performance requirements from an application (800). The application management software provides the application data volume performance requirements to the host software (810). The host software translates the data volume performance requirements into device performance attributes (820). The host software compares the device performance attributes with stored data volume performance attributes (or performance attributes of one or more NVMe namespace profiles) to determine if a suitable match exists (830).

If a suitable match exists, the host software reports the suitable data volume to the application management software (840). The application management software assigns application data to be stored on the suitable data volume (850).

If a suitable match does not exist, the host software reports to the application management software that there is no suitable data volume (860).

Figure 9:
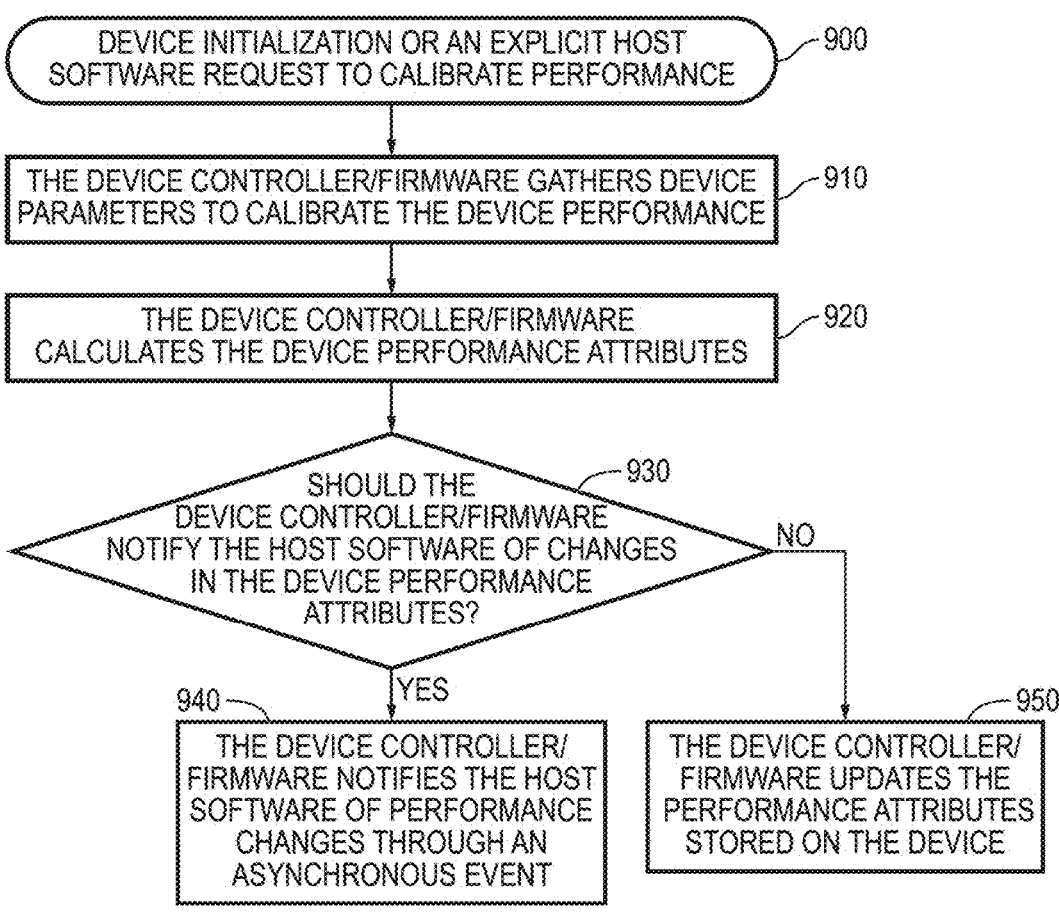
FIG. 9 is a flow chart illustrating a method of initializing or calibrating data volume performance according to an embodiment of the present invention.

FIG. 9 is a flow chart illustrating a method of initializing or calibrating data volume performance according to an embodiment of the present invention.

During device initialization or when the device receives an explicit host software request to calibrate performance (900), the device controller or firmware gathers device parameters to calibrate the device performance (910). The device controller or firmware calculates the device performance attributes (920). The device controller or firmware checks whether it should notify the host software of changes in the device performance attributes (930).

When the device controller or firmware should notify the host software of changes in the device performance attributes, the device controller or firmware notifies the host software of performance changes through an asynchronous event (940).

When the device controller or firmware should not notify the host software of changes in the device performance attributes, the device controller or firmware updates the performance attributes stored on the device (950).

Figure 10:
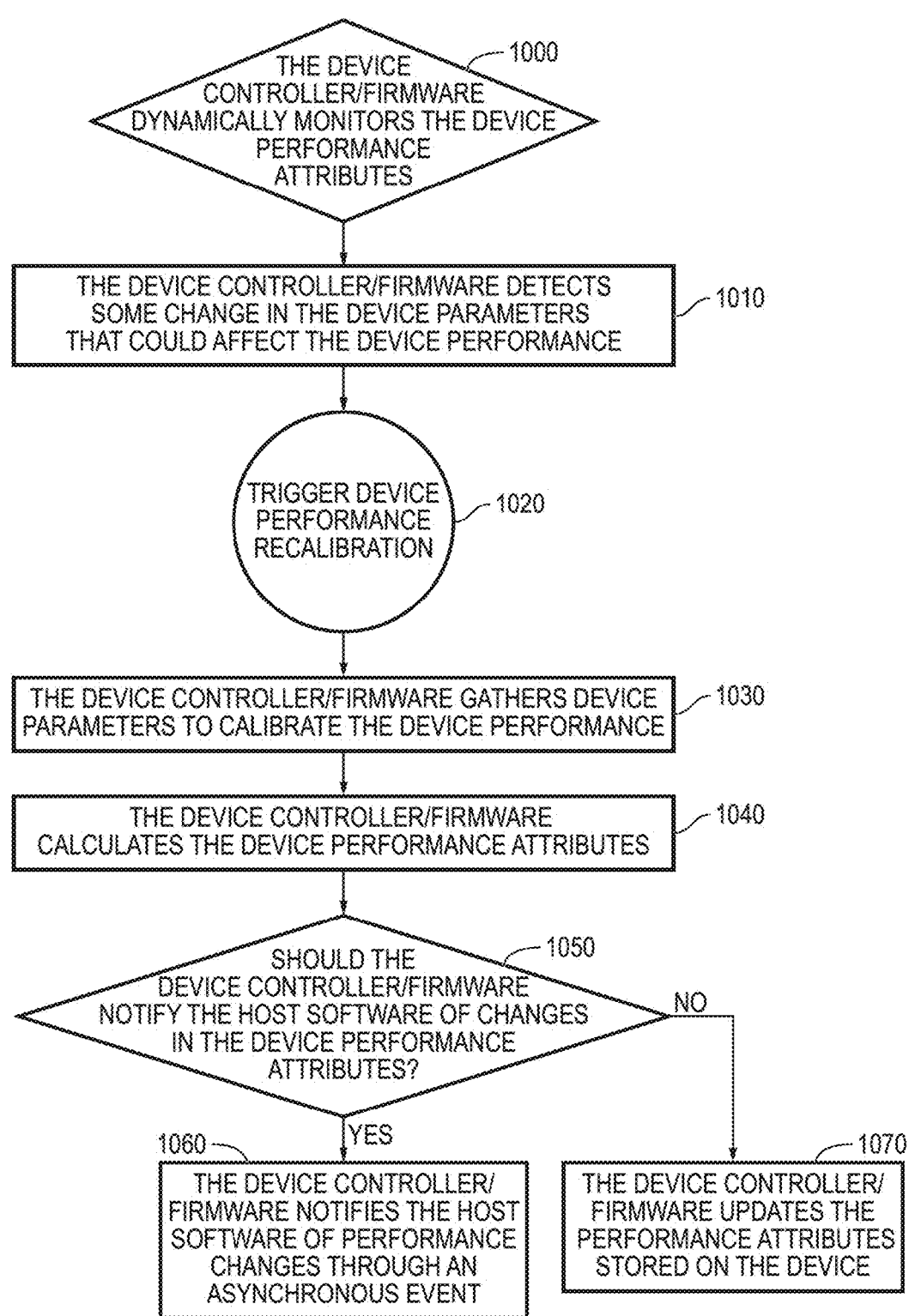
FIG. 10 is a flow chart illustrating a method of updating data volume performance according to an embodiment of the present invention.

FIG. 10 is a flow chart illustrating a method of updating data volume performance according to an embodiment of the present invention.

The device controller or firmware dynamically monitors the device performance attributes (1000). The device controller or firmware detects some change in the device parameters that could affect the device performance (1010). Device performance recalibration is triggered (1020).

The device controller or firmware gathers device parameters to calibrate the device performance (1030). The device controller or firmware calculates the device performance attributes (1040). The device controller or firmware checks whether it should notify the host software of changes in the device performance attributes (1050).

When the device controller or firmware should notify the host software of changes in the device performance attributes, the device controller or firmware notifies the host software of performance changes through an asynchronous event (1060).

When the device controller or firmware should not notify the host software of changes in the device performance attributes, the device controller or firmware updates the performance attributes stored on the device (1070).

Aspects of embodiments according to the present invention relate to non-volatile memory storage devices capable of self-reporting performance capabilities. According to an embodiment of the present invention, a storage device includes a device controller and a plurality of non-volatile storage media with different performance capabilities. The device controller tracks and stores performance capabilities of the plurality of non-volatile storage media. The device controller provides, to host software, the performance capabilities and changes to the performance capabilities.

Embodiments of the present invention include methods of presenting performance capabilities to host software layers.

Embodiments of the present invention include methods of notifying host software of any changes in performance attributes from the device.

Embodiments of the present invention include methods of intelligently assigning device resources to NVMe namespace profiles communicated by host software.

For example, embodiments of the present invention include a method of assigning, by host software, data, having data volume performance requirements, to a suitable non-volatile memory express (NVMe) namespace profile of one or more NVMe namespace profiles. The method includes: receiving, at the host software, the data volume performance requirements; translating, by the host software, the data volume performance requirements into device performance attributes; comparing, by the host software, the device performance attributes with performance attributes of the one or more NVMe namespace profiles to determine which, if any, of the one or more NVMe namespace profiles is the suitable NVMe namespace profile; and when it is determined that at least one of the one or more NVMe namespace profiles is the suitable NVMe namespace profile, assigning, by the host software, the data to be stored in the suitable NVMe namespace profile.

The method may further include, when it is determined that none of the one or more NVMe namespace profiles is the suitable NVMe namespace profile: comparing, by the host software, the device performance attributes with a device capability matrix storing device performance attributes of a plurality of storage devices to determine which resources of the plurality of storage devices to assign to a new NVMe namespace profile that meets the data volume performance requirements; creating, by the host software, the new NVMe namespace profile by assigning suitable resources of the plurality of storage devices to the new NVMe namespace profile; and assigning, by the host software, the data to be stored in the new NVMe namespace profile.

The plurality of storage devices may each include more than one type of non-volatile memory (NVM) data blocks.

The suitable resources may include resources from more than one of the plurality of storage devices.

The method may further include, prior to comparing, the device performance attributes with the device capability matrix: requesting, by the host software and from the plurality of storage devices, updated device performance attributes; and updating the device capability matrix.

When it is determined that more than one of the one or more NVMe namespace profiles is the suitable NVMe namespace profile, the data may assigned to be stored in the suitable NVMe namespace profile having performance attributes closest to the device performance attributes.

The host software may receive the data volume performance requirements and the data from an application within a host system. The host system may further include the host software and a plurality of storage devices.

Embodiments of the present invention include methods of leveraging new device level features in building simplified software to optimally match application performance requirements to device(s) and define performance profiles at a finer granular level.

Embodiments of the present invention include methods of managing heterogeneous storage devices with different performance capabilities in a storage system.

Embodiments of the present invention are applicable to SSDs of SAS, SATA, or some other future interface.

Embodiments of the present invention are applicable to any non-volatile storage media that stores data (e.g., large amounts of data).

It will be understood that, although the terms "first," "second," "third," etc., may be used herein to describe various elements, components, regions, layers, and/or sections, these elements, components, regions, layers, and/or sections should not be limited by these terms. These terms are used to distinguish one element, component, region, layer, or section from another element, component, layer, or section. Thus, a first element, component, region, layer, or section discussed below could be termed a second element, component, region, layer, or section without departing from the spirit and scope of the present invention.

A relevant device or component (or relevant devices or components) according to embodiments of the present invention described herein may be implemented utilizing any suitable hardware (e.g., an application-specific integrated circuit), firmware (e.g., a DSP or FPGA), software, or a suitable combination of software, firmware, and hardware. For example, the various components of the relevant device (s) may be formed on one integrated circuit (IC) chip or on separate IC chips. Further, the various components of the relevant device(s) may be implemented on a flexible printed circuit film, a tape carrier package (TCP), a printed circuit board (PCB), or formed on a same substrate as one or more circuits and/or other devices. Further, the various components of the relevant device(s) may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the spirit and scope of the exemplary embodiments of the present invention.

The terminology used herein is for the purpose of describing particular embodiments and is not intended to be limiting of the present invention. As used herein, the singular forms "a" and "an" are intended to include the plural forms as well, unless the context clearly indicates otherwise. It will be further understood that the terms "comprise," "comprises," "comprising," "includes," "including," and "include," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," "one of," and "selected from," when preceding a list of elements, modify the entire list of elements and do not modify the individual elements of the list. Further, the use of "may" when describing embodiments of the present invention refers to "one or more embodiments of the present invention." Also, the term "exemplary" is intended to refer to an example or illustration.

As used herein, the terms "use," "using," and "used" may be considered synonymous with the terms "utilize," "utilizing," and "utilized," respectively.

Features described in relation to one or more embodiments of the present invention are available for use in conjunction with features of other embodiments of the present invention. For example, features described in a first embodiment may be combined with features described in a second embodiment to form a third embodiment, even though the third embodiment may not be specifically described herein.

A person of skill in the art should also recognize that the process may be executed via hardware, firmware (e.g., via an ASIC), or in any combination of software, firmware, and/or hardware. Furthermore, the sequence of steps of the process is not fixed, but can be altered into any desired sequence as recognized by a person of skill in the art. The altered sequence may include all of the steps or a portion of the steps.

Although this invention has been described with regard to certain specific embodiments, those skilled in the art will have no difficulty devising variations of the described embodiments, which in no way depart from the scope and spirit of the present invention. Furthermore, to those skilled in the various arts, the invention itself described herein will suggest solutions to other tasks and adaptations for other applications. It is the Applicant's intention to cover by claims all such uses of the invention and those changes and modifications which could be made to the embodiments of the invention herein chosen for the purpose of disclosure without departing from the spirit and scope of the invention. Thus, the present embodiments of the invention should be considered in all respects as illustrative and not restrictive, the scope of the invention to be indicated by the appended claims and their equivalents.

What is claimed is:

1. A storage device comprising:
a first non-volatile storage medium having a first performance capability associated with a namespace within the storage device; and
a device controller configured to perform:
comparing a requested performance capability with a database on the storage device, the database comprising an association between the first performance capability and the namespace;
determining that the requested performance capability is compatible with the first performance capability; and
sending, from the storage device to a host software, an indication that the namespace meets the requested performance capability.

2. A method for determining performance capabilities, the method comprising:
comparing, by a device controller, a requested performance capability with a database on a storage device, the database comprising an association between a first performance capability and a namespace;
determining, by the device controller, that the requested performance capability is compatible with the first performance capability; and
sending, by the device controller, from the storage device to a host software, an indication that the namespace meets the requested performance capability.

3. The method of claim 2, further comprising sending, from the storage device to the host software, a report comprising the first performance capability.

4. The method of claim 2, further comprising detecting, by the device controller, a change to the first performance capability.

5. The method of claim 4, further comprising sending, from the storage device to the host software, a report comprising the change to the first performance capability.

6. The method of claim 2, wherein the device controller is located at a hardware of the storage device.

7. The method of claim 2, further comprising assigning, by the device controller, one or more resources of the storage device to the namespace based on a performance attribute of the one or more resources.

8. The method of claim 7, further comprising determining the one or more resources for assigning to the namespace based on:
calculating a first device performance attribute of a first non-volatile storage medium;
calculating a second device performance attribute of a second non-volatile storage medium; and
comparing the first device performance attribute and the second device performance attribute.

9. The storage device of claim 1, wherein the device controller is configured to perform sending from the storage device to the host software, a report comprising the first performance capability.

10. The storage device of claim 1, wherein the device controller is configured to perform detecting a change to the first performance capability.

11. The storage device of claim 10, wherein the device controller is configured to perform sending, from the storage device to the host software, a report comprising the change to the first performance capability.

12. The storage device of claim 1, wherein the device controller is located at a hardware of the storage device.

13. The storage device of claim 1, wherein the device controller is configured to perform assigning one or more resources of the storage device to the namespace based on a performance attribute of the one or more resources.

14. The storage device of claim 13, wherein the device controller is configured to perform determining the one or more resources for assigning to the namespace by:
calculating a first device performance attribute of a first non-volatile storage medium;
calculating a second device performance attribute of a second non-volatile storage medium; and
comparing the first device performance attribute and the second device performance attribute.

15. A system comprising:
a processor; and
a memory communicatively connected to the processor, and storing instructions that, based on being executed by the processor, cause the processor to perform:
comparing a requested performance capability with a database on a storage device, the database comprising an association between a first performance capability and a namespace;
determining that the requested performance capability is compatible with the first performance capability; and
sending, from the storage device to a host software, an indication that the namespace meets the requested performance capability.

16. The system of claim 15, wherein the instructions, based on being executed by the processor, cause the processor to perform sending, from the storage device to the host software, a report comprising the first performance capability.

17. The system of claim 15, wherein the instructions, based on being executed by the processor, cause the processor to perform detecting a change to the first performance capability.

18. The system of claim 17, wherein the instructions, based on being executed by the processor, cause the processor to perform sending, from the storage device to the host software, a report comprising the change to the first performance capability.

19. The system of claim 15, wherein the instructions, based on being executed by the processor, cause the processor to perform assigning one or more resources of the storage device to the namespace based on a performance attribute of the one or more resources.

20. The system of claim 19, wherein the instructions, based on being executed by the processor, cause the processor to perform determining the one or more resources for assigning to the namespace based on:

calculating a first device performance attribute of a first non-volatile storage medium;

calculating a second device performance attribute of a second non-volatile storage medium; and comparing the first device performance attribute and the second device performance attribute.

\* \* \* \* \*